United States Patent
Li et al.

(10) Patent No.: US 10,515,455 B2
(45) Date of Patent: Dec. 24, 2019

(54) OPTICAL FLOW MEASUREMENT

(71) Applicant: The Regents of the University of Michigan, Ann Arbor, MI (US)

(72) Inventors: Ziyun Li, Ann Arbor, MI (US); Hun-Seok Kim, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 143 days.

(21) Appl. No.: 15/279,581

(22) Filed: Sep. 29, 2016

(65) Prior Publication Data
US 2018/0089838 A1   Mar. 29, 2018

(51) Int. Cl.
*G06T 7/00* (2017.01)
*G06T 7/20* (2017.01)
*G06T 7/269* (2017.01)

(52) U.S. Cl.
CPC .................. *G06T 7/269* (2017.01)

(58) Field of Classification Search
CPC ........... G06T 7/2033; G06T 7/60; G06T 7/62; G06T 7/64; G06T 7/66; G06T 7/68; G06T 2207/00; G06T 2207/10016; G06T 2207/30; G06T 2207/30004; G06T 2207/30101; G06T 2207/30104; G06T 2207/10084; G06T 2207/10081; G06T 2207/10072; G06T 2207/2207
USPC ........ 382/195–199, 130, 236, 201–203, 206, 382/217–221
See application file for complete search history.

(56) References Cited

U.S. PATENT DOCUMENTS

| | | | | |
|---|---|---|---|---|
| 2003/0086499 | A1* | 5/2003 | Lunter | G06T 7/238 375/240.16 |
| 2007/0299596 | A1* | 12/2007 | Moritz | G06T 7/80 701/1 |
| 2015/0169954 | A1* | 6/2015 | Schlattmann | G06T 7/20 382/103 |

FOREIGN PATENT DOCUMENTS

| | | | |
|---|---|---|---|
| JP | 2001012946 | A * | 1/2001 |
| KR | 101321974 | B1 * | 11/2013 |

OTHER PUBLICATIONS

S. Hermann et al, "Hierarchical Scan-Line Dynamic Programming for Optical Flow Using Semi-Global Matching" *ACCV'12 Proceedings of the 11th International Conference on Computer Vision*, vol. 2, Nov. 5, 2012, pp. 556-567.

(Continued)

*Primary Examiner* — Dwayne D Bost
*Assistant Examiner* — Stephen M Brinich
(74) *Attorney, Agent, or Firm* — Nixon & Vanderhye P.C.

(57) ABSTRACT

Optical flow is measured between a first image and a second image by evaluating a match quantifying parameter in respect of a set of candidate flow vectors. The set of candidate flow vectors includes one or more flow vectors selected in dependence upon one or more neighbor flow vectors associated with one or more neighboring pixels to the given pixel which have previously calculated respective match quantifying parameters indicative of closest matches for the one or more neighboring pixels. The set of candidate flow vectors also includes adjacent flow vectors corresponding to target pixels surrounding the target pixels identified by the neighbor flow vectors. One or more randomly selected random flow vectors is also added to the set of candidate flow vectors. The calculated match quantifying parameters are weighted in dependence upon whether the corresponding (Continued)

Figure 1:
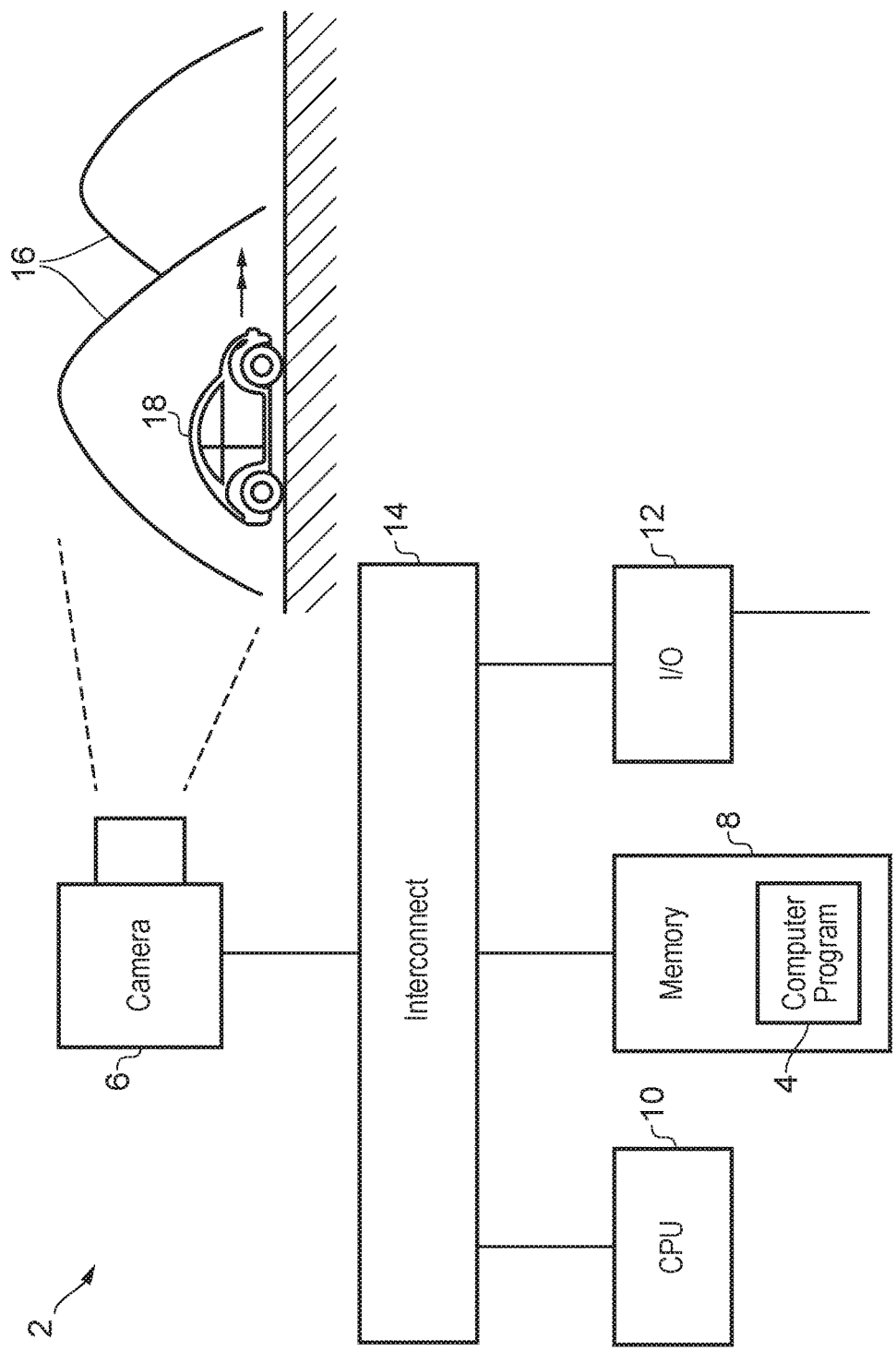

candidate flow vector is similar to any other candidate flow vector.

17 Claims, 5 Drawing Sheets

(56) References Cited

OTHER PUBLICATIONS

H. Hirschmuller, "Stereo Processing by Semi-Global Matching and Mutual Information" *IEEE Transactions on Pattern Analysis and Machine Intelligence*, accepted Apr. 16, 2007, pp. 1-14.
C. Barnes et al, "PatchMatch: A Randomized Correspondence Algorithm for Structural Image Editing" *ACM Trans. Graph*, vol. 28, No. 3, Article 24, Aug. 2009, pp. 1-11.
H. Hirschmuller et al, "Evaluation of Stereo Matching Costs on Images with Radiometric Differences" *IEEE Transactions on Pattern Analysis and Machine Intelligence*, accepted Aug. 11, 2008, pp. 1-17.

* cited by examiner

☐ = given pixel

\# (neighbor flow vectors)

\* (adjacent flow vectors)

? (random flow vectors)

\# U \* U ? = target pixels array at $t_1$

|   |   |   |   |   |   |   |   |
|---|---|---|---|---|---|---|---|
|   | * | * | * |   | ? |   |   |
|   | * | # | * |   |   |   |   |
|   | * | * | * |   |   |   |   |
| ? |   |   | ☐ | * | * | * |   |
|   |   |   |   | * | # | * |   |
|   | * | * | * | * | * | * |   |
|   | * | # | * |   |   |   |   |
|   | * | * | * |   |   |   |   |

FIG. 4

OPTICAL FLOW MEASUREMENT

BACKGROUND

Field

This disclosure relates to the measurement of optical flow between a first image and a second image.

Description

It is known to measure optical flow between a first image and a second image whereby a flow vector is associated with each pixel within an image indicating the change in position between images of the objection represented by that pixel. Such optical flow measurement has many potential uses, such as in machine vision applications. A problem with optical flow measurement is the high computational load associated in matching pixels between images.

SUMMARY

Viewed from one aspect the present disclosure provides a method of measuring optical flow between a first image comprising a first array of pixels and a second image comprising a second array of pixels, said method comprising:

selecting a set of candidate flow vectors to be evaluated to determine a result flow vector to associate with a given pixel within said first array;

for each candidate flow vector of said set of candidate flow vectors calculating a match quantifying parameter indicative of how closely said given pixel matches a target pixel within said second array, each said target pixel being displaced from said given pixel within said first array by a respective one of said set of candidate flow vectors; and selecting said result flow vector from among said set of candidate flow vectors, said result flow vector having a value of said match quantifying parameter indicative of a closest match between said given pixel and a corresponding target pixel; wherein said set of candidate flow vectors includes one or more flow vectors selected in dependence upon one or more neighbor flow vectors associated with one or more neighboring pixels within said first array to said given pixel, said one or more neighbor flow vectors having previously calculated respective match quantifying parameters indicative of closest matches for said one or more neighboring pixels.

Viewed from another aspect the present disclosure provides a computer program stored on a non-transitory medium for controlling a data processing apparatus to measuring optical flow between a first image comprising a first array of pixels and a second image comprising a second array of pixels by:

selecting a set of candidate flow vectors to be evaluated to determine a result flow vector to associate with a given pixel within said first array;

for each candidate flow vector of said set of candidate flow vectors calculating a match quantifying parameter indicative of how closely said given pixel matches a target pixel within said second array, each said target pixel being displaced from said given pixel within said first array by a respective one of said set of candidate flow vectors; and selecting said result flow vector from among said set of candidate flow vectors, said result flow vector having a value of said match quantifying parameter indicative of a closest match between said given pixel and a corresponding target pixel; wherein said set of candidate flow vectors includes one or more flow vectors selected in dependence upon one or more neighbor flow vectors associated with one or more neighboring pixels within said first array to said given pixel, said one or more neighbor flow vectors having previously calculated respective match quantifying parameters indicative of closest matches for said one or more neighboring pixels.

Viewed from another aspect the present disclosure provides apparatus for measuring optical flow between a first image comprising a first array of pixels and a second image comprising a second array of pixels, said apparatus comprising:

a set selector to select a set of candidate flow vectors to be evaluated to determine a result flow vector to associate with a given pixel within said first array;

a match calculator to calculate for each candidate flow vector of said set of candidate flow vectors a match quantifying parameter indicative of how closely said given pixel matches a target pixel within said second array, each said target pixel being displaced from said given pixel within said first array by a respective one of said set of candidate flow vectors; and a result flow vector selector to select said result flow vector from among said set of candidate flow vectors, said result flow vector having a value of said match quantifying parameter indicative of a closest match between said given pixel and a corresponding target pixel; wherein said set of candidate flow vectors includes one or more flow vectors selected in dependence upon one or more neighbor flow vectors associated with one or more neighboring pixels within said first array to said given pixel, said one or more neighbor flow vectors having previously calculated respective match quantifying parameters indicative of closest matches for said one or more neighboring pixels.

The above, and other objects, features and advantages of this disclosure will be apparent from the following detailed description of illustrative embodiments which is to be read in connection with the accompanying drawings.

DRAWINGS

Figure 2:
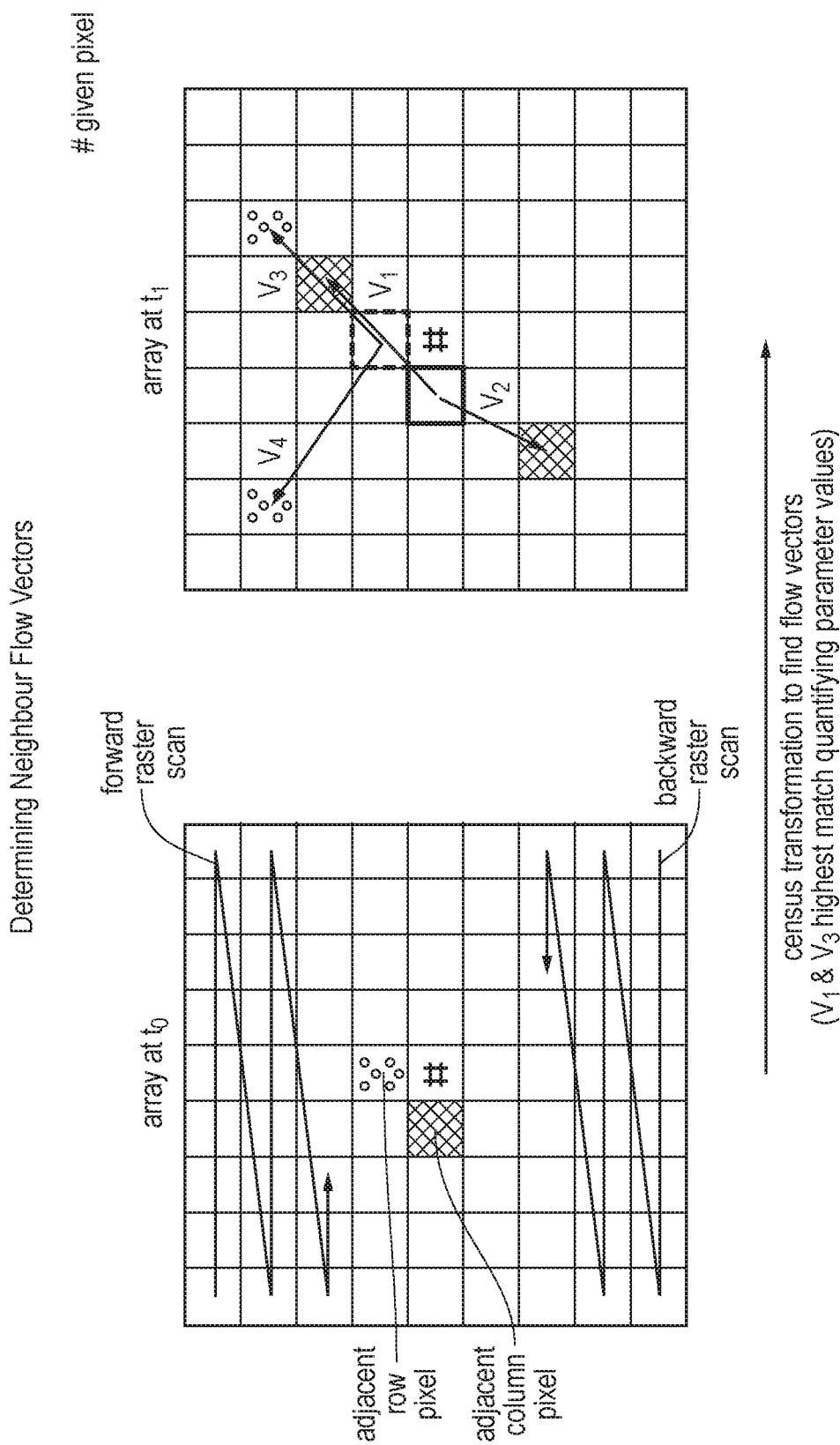
Figure 3:
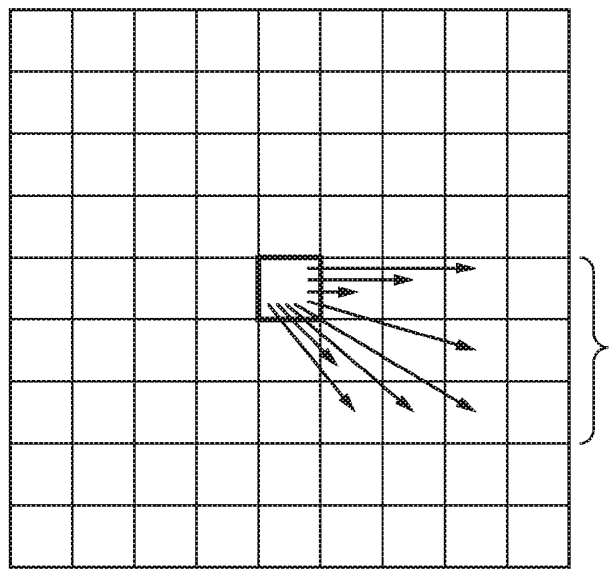
Figure 3:
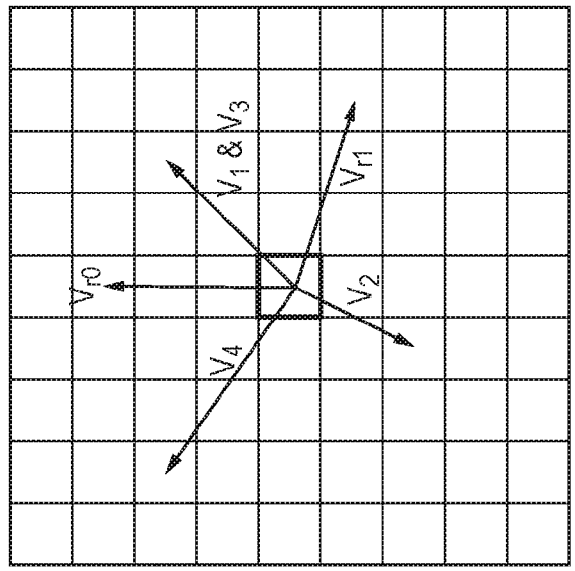
Figure 5:
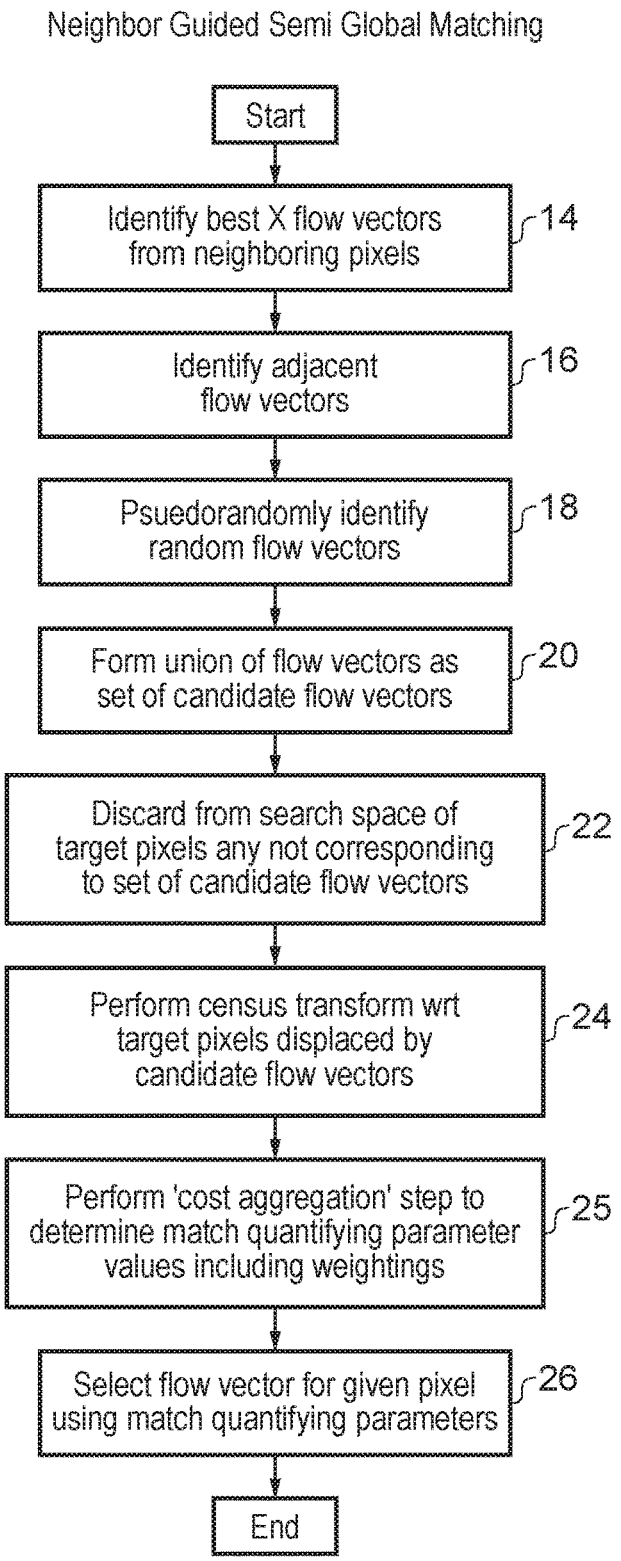

FIG. 1 schematically illustrates a data processing apparatus for executing a computer program to perform optical flow measurement;

FIG. 2 schematically illustrates the determining of neighboring flow vectors for a given pixel;

FIG. 3 schematically illustrates the forming of a set of candidate flow vectors for the given pixel;

FIG. 4 schematically illustrates target pixels as identified by candidate flow vectors and for which a match quantifying parameter is to be calculated; and FIG. 5 is a flow diagram schematically illustrating neighbor-guided semi global matching for determining optical flow.

EMBODIMENTS

FIG. 1 schematically illustrates an apparatus 2 for performing a method of measuring optical flow between a first image comprising a first array of pixels and a second image comprising a second array of pixels under control of a computer program 4. The apparatus 2 includes a camera 6 for capturing a sequence of images each comprising an array of pixels. These images may be stored within a memory 8 and then accessed and manipulated under control of the program instructions of the computer program 4 using a processor 10. The optical flow measured may be used to perform other processing and control operations, such as controlling other devices via input/output circuitry 12. An interconnect 14 serves to link the camera 6, the processor 10, the memory 8 and the input/output circuitry 12.

In the example illustrated, the camera 6 is directed to a scene comprising a static background formed of mountains 16 with a moving object in the moving foreground comprising a car 18. In successive images captured by the camera 6, the pixels within the array of pixels comprising the captured images have an optical flow dependent upon whether they correspond to a portion of the static background 16 or the moving foreground 18. Pixels within a first image corresponding to the static background 16 will match with corresponding pixels within a second image (immediately following in a temporal sequence) with no or little displacement between them and accordingly with zero or small optical flow vectors. By contrast, a pixel corresponding to a position within the foreground object 18 will match with the corresponding pixel within the following image that is displaced by an amount corresponding to the motion of the car between the two images. This displacement of the pixel between the two images corresponds to the optical flow vector for that pixel between the two images.

When determining which pixel within a second image best matches a given pixel within a first image a considerable amount of computation is needed. The calculation of a match quantifying parameter for each target pixel within the second image which may correspond to a given pixel within a first image can be performed in a variety of different ways, including by determining a Hamming distance of census transformed pixels and then applying a weighting (penalties) dependent upon the Euclidean distance between the current candidate flow vector being evaluated and neighbour pixel's optical flow vector. This Euclidean distance corresponds to a degree of correlation between the two vectors. In order to reduce the computation load associated with identifying the optical flow between a first image and a second image, the present techniques serve to limit the target pixels for which the match quantifying parameter is calculated to target pixels within the second image having a high probability of representing the best match with the given pixel.

This may be achieved by determining a set of candidate flow vectors to be evaluated to determine a result flow vector for a given pixel with the selection of which candidate flow vectors are to be included within the set of candidate flow vectors being guided in dependence upon one or more neighbor flow vectors associated with one or more neighboring pixels which neighbor the given pixel within the first image. It is likely that the flow vector associated with a given pixel is well correlated with the flow vector of neighboring pixels. This feature can be used to reduce the computational load of the determination of the optical flow by focusing on a set of candidate flow vectors which has been selected at least partially in dependence upon neighbor flow vectors and accordingly reduce the search space compared to the search space corresponding to all potential flow vectors. More particularly, a standard semi global match algorithm may utilise a contiguous array of target pixels centred on the given pixel and determine the match quantifying parameter in respect of all of these target pixels in order to identify the best matching target pixel which corresponds to the optical flow vector for the given pixel. In contrast, the present technique effectively discards pixels from this contiguous search space and retains as target pixels for which the match quantifying is to be calculated those target pixel corresponding to one or more flow vectors which have been identified in respect of one or more neighboring pixels to the given pixel.

The set of candidate flow vectors may also include adjacent flow vectors selected to correspond to target pixels surrounding those target pixels exactly corresponding to neighbor flow vectors. The inclusion of such adjacent flow vectors recognises that whilst correlated with their neighbor flow vectors, the optical flow vector of a given pixel may not be exactly the same as that of the neighbor pixel and accordingly the best matching target pixel may be in an adjacent row or column to the target pixel identified by the neighbor flow vector.

The set of candidate flow vectors may also include one or more randomly selected flow vectors with a random magnitude and a random direction (subject to some predetermined maximum magnitude). Including one or more such random flow vectors within the set of candidate flow vectors provides improved robustness to the optical flow measurement by permitting, for example, matches to be made which take account of options of portions of an image which may be revealed or obscured between successive images.

FIG. 2 schematically illustrates the determining of neighboring flow vectors for a given pixel. In FIG. 2 the given pixel for which an optical flow vector is to be determined is indicated by an "#". Such a given pixel is located within an array of pixels which includes columns and rows. The first image comprises an array of pixels captured at time $t_0$. The second image comprises an array of pixels captured at time $t_1$. The pixels within the first image are processed following a raster scan order as illustrated with each pixel in turn being treated as the given pixel for which the optical flow vector is to be identified.

For a particular instance of the given pixel, there are present within the first image one or more neighbor pixels for which the optical flow vector will already have been determined for the particular scan direction concerned—the neighbor pixels show in FIG. 2 are for the forward raster scan direction. The process may additionally include a backward raster scan processing stage with the set of candidate flow vectors being the union of the sets identified in the forward and backward scans. When there are no such neighbor pixels found (e.g. at the start of the raster scan, or along edges of the image), then a full conventional search space of target pixels for which the match quantifying parameter is to be calculated may be used, with the neighbored guiding of the present techniques being used within the main body of the first image. In the case of the forward raster scan illustrated in FIG. 2, this proceeds from left to right within the first array and from top to bottom within the first array. The neighbor pixels for which neighbor flow vectors have already been determined follow that raster scan include those adjacent and abutting the given pixel in the adjacent column to the left of the given pixel and the adjacent row above the given pixel. The present techniques may be employed in some example embodiments in which, having identified neighbor flow vectors following an analysis corresponding to the raster scan of FIG. 2, the raster scan is reversed to flow from right to left and from bottom to top with the neighbor pixels for which neighbor flow vectors have already been determined then corresponding to pixels adjacent and abutting the given pixel to the right and below the given pixel. The set of candidate flow vectors is then determined to be the union of the sets identified in the forward and backward scans.

As illustrated in FIG. 2 for the given pixel shown the neighbor pixels from which neighbor flow vectors are to be drawn comprise an adjacent row pixel immediately above the given pixel and an adjacent column pixel immediately to the left of the given pixel. The second image corresponding to time $t_1$ shown in FIG. 2 illustrates how the adjacent row pixel has best matching optical flow vectors associated with it which are $v_3$ and $v_4$. In practice, the determination of the own optical flow vector for the neighbor pixels will have identified several possible optical flow vectors and the ones of these which correspond to the closest matches (as indicated by the match quantifying parameter) are selected to be included within the set of candidate flow vectors for the given pixel. For example, as illustrated in FIG. 2, the flow vectors $v_3$ and $v_4$ associated with the adjacent row pixel are both included as members of the set of candidate flow vectors to be evaluated in respect of the given pixel. The adjacent column pixel illustrated in FIG. 2 has neighbor flow vectors $v_1$ and $v_2$ associated with it. These neighbor flow vectors $v_1$ and $v_2$ are included within the set of candidate flow vectors for the given pixel.

It will be seen from FIG. 2 that the vectors $v_1$ and $v_3$ match each other in direction and magnitude. This corresponds to a situation in which the adjacent row pixel and the adjacent column pixel are both subject to the same optical flow (as is statistically likely within real world images). For this reason, when calculating a match quantifying parameter associated with a given candidate flow vector for the given pixel with the given candidate flow vector being associated with a given neighboring pixel, the match quantifying parameter is weighted to indicate a closer match in dependence upon the correlation between the given candidate flow vector and other candidate flow vectors within the set of candidate flow vectors associated with other neighboring pixels. The Hamming distance measure of correlation can be weighted by a factor dependent upon the Euclidean distance between the candidate vector under consideration and neighbor pixel's optical flow vectors already determined. Thus, in the example illustrated in FIG. 2, since: (i) the vectors $v_1$ and $v_3$ are both included within the set of candidate flow vectors for the given pixel, (ii) these vectors match each other, and (iii) the vectors are associated with different neighboring pixels; there is an increased likelihood that they represent the correct optical flow for the given pixel and this is reflected by weighting the match quantifying parameter (e.g. increasing to indicate a better match or applying a reduced penalty) which is calculated for the given pixel using either the vector $v_1$ or $v_3$. This weighting is applied such that candidate flow vectors which closely match each other and relate to different neighboring pixels are weighted to indicate a close degree of matching. Candidate flow vectors which less accurately match other candidate flow vectors for other neighboring pixels are given a lower degree of weighting. Candidate flow vectors, such as randomly selected random flow vectors, which do not match any other flow vectors within the set of candidate flow vectors, are not given any weighting to their match quantifying parameter which would increase the degree of match indicated by the match quantifying parameter.

The calculation of the match quantifying parameter may be performed using a Hamming distance upon census transformed pixels between the first image and the second image together with the weighting (penalties discussed above). In the example illustrated, at least partially due the weightings discussed above, the highest match quantifying parameters are identified for the candidate flow vectors $v_1$ and $v_3$. It will be appreciated that other ways of determining a match quantifying parameter may additionally or alternatively be used.

FIG. 3 schematically illustrates further features of the forming of the set of candidate flow vectors. In the left hand portion of FIG. 3, the given pixel is illustrated with a set of candidate vectors which includes the neighbor flow vectors $v_1/v_3$, $v_2$ and $v_4$. To this set of candidate flow vectors are added two randomly selected random flow vectors $v_{r0}$ and $v_{r1}$. The set of neighbor flow vectors is set N. The set of random flow vectors is set R. The set of neighbor flow vectors need only include one of vectors $v_1$ and $v_3$ as these are the same as each other (at least within a predetermined tolerance) in their direction of magnitude.

As previously mentioned, in real world images the optical flow vectors for neighboring pixels may vary slightly and accordingly the best match for a given pixel within a following image may be a target pixel which is adjacent to a target pixel indicated by a neighbor flow vector itself. Accordingly, when forming the set of candidate flow vectors, these are selected to include adjacent flow vectors corresponding to displacements within the first array from the corresponding one of the one or more neighboring pixels to respective adjacent pixels adjacent to the neighbor-pixel target pixel within the first array. As illustrated in the right hand portion of FIG. 3, the neighbor flow vector $v_2$ is included within the set of candidate flow vectors. Associated with this neighbor flow vector $v_2$ there are eight adjacent flow vectors corresponding to target pixels which surround the target pixel which corresponds exactly to the neighbor flow vector $v_2$. Thus, together with a neighbor flow vector $v_2$ there is an associated set of adjacent flow vectors $A_2$ which comprises the eight surrounding target pixel positions as shown. A set of adjacent flow vectors is associated with each of the neighbor flow vectors. Thus, there is a set of adjacent flow vectors $A_1$ which correspond to neighbor flow vector $v_1$ and a set of adjacent flow vectors $A_4$ which corresponds to the neighbor flow vector $v_4$.

The full set of candidate flow vectors to be evaluated for the given pixel from the forward raster scan processing direction is the union of sets corresponding to the neighbor flow vectors N, the random flow vectors R and the adjacent flow vectors $A_1$, $A_2$ and $A_4$. The processing of FIGS. 2 and 3 may also be repeated for the backward raster scan direction and the resulting identified candidate flow vectors combined (by a set union) to form the set for which the match quantifying parameters are determined.

FIG. 4 schematically illustrates the target pixels within the second image which correspond to respective candidate flow vectors within the set of candidate flow vectors formed as discussed in relation to FIG. 3 (forward raster scan only). As will be seen from FIG. 4, the set of target pixels for which the match quantifying parameter is to be determined is reduced compared to the total potential search space of possible target pixels in accordance with conventional semi global matching. This reduction in the number of target pixels for which the match quantifying parameter is to be determined reduces the computational load and yet still allows accurate optical flow vectors to be determined with good reliability. In FIG. 4 the target pixels marked "#" correspond to those displaced in direction and magnitude from the given pixel by amounts corresponding to neighbor flow vectors. The target pixels marked "*" correspond to adjacent flow vectors surrounding the pixels identified by the neighbor flow vectors. The target pixels marked "?" correspond to the random flow vectors. Adjacent pixels are not included for such random flow vectors. The target pixels which are subject to match quantifying parameter calculation comprises the union of the different sets of target pixels illustrated in FIG. 4.

FIG. 5 is a flow diagram schematically illustrating neighbor guided semi-global matching. At step 14 the best X (e.g. a predetermined best number, or a number which have match quantifying parameters greater than a given threshold) flow vectors from neighboring pixels to a given pixel are identified. At step 16 the adjacent flow vectors for the neighbor flow vectors identified at step 14 are identified. Step 18 pseudo-randomly identifies the random flow vectors which are to be included within the set of candidate flow vectors. Step 20 forms a union of the flow vectors identified at steps 14, 16 and 18 to form the set of candidate flow vectors. Step 22 then discards from the search space target pixels which do not correspond to any of the set of candidate flow vectors from the given pixel. Step 24 performs a census transform with respect to target pixels displaced by the candidate flow vectors using the Hamming distance. Step 25 then performs a cost aggregation step to determine the match quantifying parameters for each candidate flow vector including applying weightings (or penalties) to the Hamming distances dependent upon the Euclidean distance between the candidate flow vector concerned and neighbour pixel's already determined optical flow vector. Step 26 determines the flow vector for the given pixel which is indicated as providing the best match between the given pixel and a target pixel by the match quantifying parameters calculated at step 24.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. A method of transforming a first image and a second image into an array of optical flow vectors representing displacement between the first and second images, the first image comprising a first array of pixels and the second image comprising a second array of pixels, said method comprising processing circuitry performing the following steps:
   selecting a set of candidate flow vectors to be evaluated to determine an optical flow vector to associate with a given pixel within said first array;
   for each candidate flow vector of said set of candidate flow vectors calculating a match quantifying parameter indicative of how closely said given pixel matches a target pixel within said second array, each said target pixel being displaced from said given pixel within said first array by a respective one of said set of candidate flow vectors; and
   selecting said optical flow vector from among said set of candidate flow vectors, said optical flow vector having a value of said match quantifying parameter indicative of a closest match between said given pixel and a corresponding target pixel; wherein
   said array of optical flow vectors comprises a plurality of optical flow vectors, each optical flow vector of the array generated by processing a respective pixel of the first array as said given pixel;
   said set of candidate flow vectors includes one or more flow vectors selected in dependence upon one or more neighbor flow vectors associated with one or more neighboring pixels within said first array to said given pixel, said one or more neighbor flow vectors having previously calculated respective match quantifying parameters indicative of closest matches for said one or more neighboring pixels, and
   said set of candidate flow vectors includes flow vectors corresponding to a limited subset of target pixels within a contiguous search space thereby reducing a processing workload to determine said array of optical flow vectors.

2. A method as claimed in claim 1, wherein at least some of said one or more flow vectors selected in dependence upon one or more neighbor flow vectors have a same magnitude and a same direction as respective neighbor flow vectors.

3. A method as claimed in claim 1, wherein
   a neighboring-pixel target pixel is displaced from a corresponding one of said one or more neighboring pixel within said first array by a corresponding one of said one or neighbor flow vectors, and
   said set of candidate flow vectors is selected to include one or more adjacent flow vectors corresponding to displacements within said first array from said corresponding one of said one or more neighboring pixels to respective adjacent pixels adjacent to said neighboring-pixel target pixel within said first array.

4. A method as claimed in claim 3, wherein said adjacent pixels surround said neighboring-pixel target pixel.

5. A method as claimed in claim 1, wherein pixels are selected as said given pixel following one or more scan patterns within said first array and said one or more neighboring pixels precede said given pixel within said one or more scan patterns.

6. A method as claimed in claim 5, wherein said one or more scan patterns are raster scan patterns.

7. A method as claimed in claim 1, wherein said set of candidate flow vectors include one or more flow vectors selected in dependence upon neighbor flow vectors for each of a plurality of neighboring pixels.

8. A method as claimed in claim 7, wherein said array of pixels comprises a plurality of rows of pixels and a plurality of columns of pixels and said plurality of neighboring pixels are within at least one of an adjacent row to said given pixel and an adjacent column to said given pixel.

9. A method as claimed in claim 1, wherein said set of candidate flow vectors comprises one or more randomly selected random flow vectors with a random magnitude and/or a random direction.

10. A method as claimed in claim 9, wherein said one or more randomly selected flow vectors have a random magnitude of less than a predetermined maximum magnitude.

11. A method as claimed in claim 1, wherein said step of calculating said match quantifying parameter uses a Hamming distance of census transformed pixels.

12. A method as claimed in claim 1, wherein said calculating said match quantifying parameter for a given candidate flow vector associated with a given neighboring pixel weights said match quantifying parameter for said given candidate flow vector to indicate closer matching in dependence upon correlation between said given candidate flow vector and other candidate flow vectors within said set of candidate flow vectors associated with other neighboring pixels.

13. The method in claim 1, wherein said set of candidate flow vectors excludes at least one flow vector corresponding to a discarded pixel of the contiguous space.

14. A computer program stored on a non-transitory medium for controlling a data processing apparatus to transform a first image and a second image into an array of optical flow vectors representing displacement between the first and second images, the first image comprising a first array of pixels and the second image comprising a second array of pixels by:

selecting a set of candidate flow vectors to be evaluated to determine an optical flow vector to associate with a given pixel within said first array;

for each candidate flow vector of said set of candidate flow vectors calculating a match quantifying parameter indicative of how closely said given pixel matches a target pixel within said second array, each said target pixel being displaced from said given pixel within said first array by a respective one of said set of candidate flow vectors; and selecting said optical flow vector from among said set of candidate flow vectors, said optical flow vector having a value of said match quantifying parameter indicative of a closest match between said given pixel and a corresponding target pixel; wherein said array of optical flow vectors comprises a plurality of optical flow vectors, each optical flow vector of the array generated by processing a respective pixel of the first array as said given pixel;

said set of candidate flow vectors includes one or more flow vectors selected in dependence upon one or more neighbor flow vectors associated with one or more neighboring pixels within said first array to said given pixel, said one or more neighbor flow vectors having previously calculated respective match quantifying parameters indicative of closest matches for said one or more neighboring pixels, and said set of candidate flow vectors includes flow vectors corresponding to a limited subset of target pixels within a contiguous search space thereby reducing a processing workload to determine said array of optical flow vectors.

15. The computer program stored on the non-transitory medium in claim 14, wherein said set of candidate flow vectors excludes at least one flow vector corresponding to a discarded pixel of the contiguous space.

16. Apparatus for transforming a first image and a second image into an array of optical flow vectors representing displacement between the first and second images, the first image comprising a first array of pixels and the second image comprising a second array of pixels, said apparatus comprising:

a set selector to select a set of candidate flow vectors to be evaluated to determine an optical flow vector to associate with a given pixel within said first array;

a match calculator to calculate for each candidate flow vector of said set of candidate flow vectors a match quantifying parameter indicative of how closely said given pixel matches a target pixel within said second array, each said target pixel being displaced from said given pixel within said first array by a respective one of said set of candidate flow vectors; and an optical flow vector selector to select said optical flow vector from among said set of candidate flow vectors, said optical flow vector having a value of said match quantifying parameter indicative of a closest match between said given pixel and a corresponding target pixel; wherein said array of optical flow vectors comprises a plurality of optical flow vectors, each optical flow vector of the array generated by processing a respective pixel of the first array as said given pixel;

said set of candidate flow vectors includes one or more flow vectors selected in dependence upon one or more neighbor flow vectors associated with one or more neighboring pixels within said first array to said given pixel, said one or more neighbor flow vectors having previously calculated respective match quantifying parameters indicative of closest matches for said one or more neighboring pixels, and said set of candidate flow vectors includes flow vectors corresponding to a limited subset of target pixels within a contiguous search space thereby reducing a processing workload to determine said array of optical flow vectors.

17. The apparatus in claim 16, wherein said set of candidate flow vectors excludes at least one flow vector corresponding to a discarded pixel of the contiguous space.

* * * * *